United States Patent Office 2,698,769
Patented Jan. 4, 1955

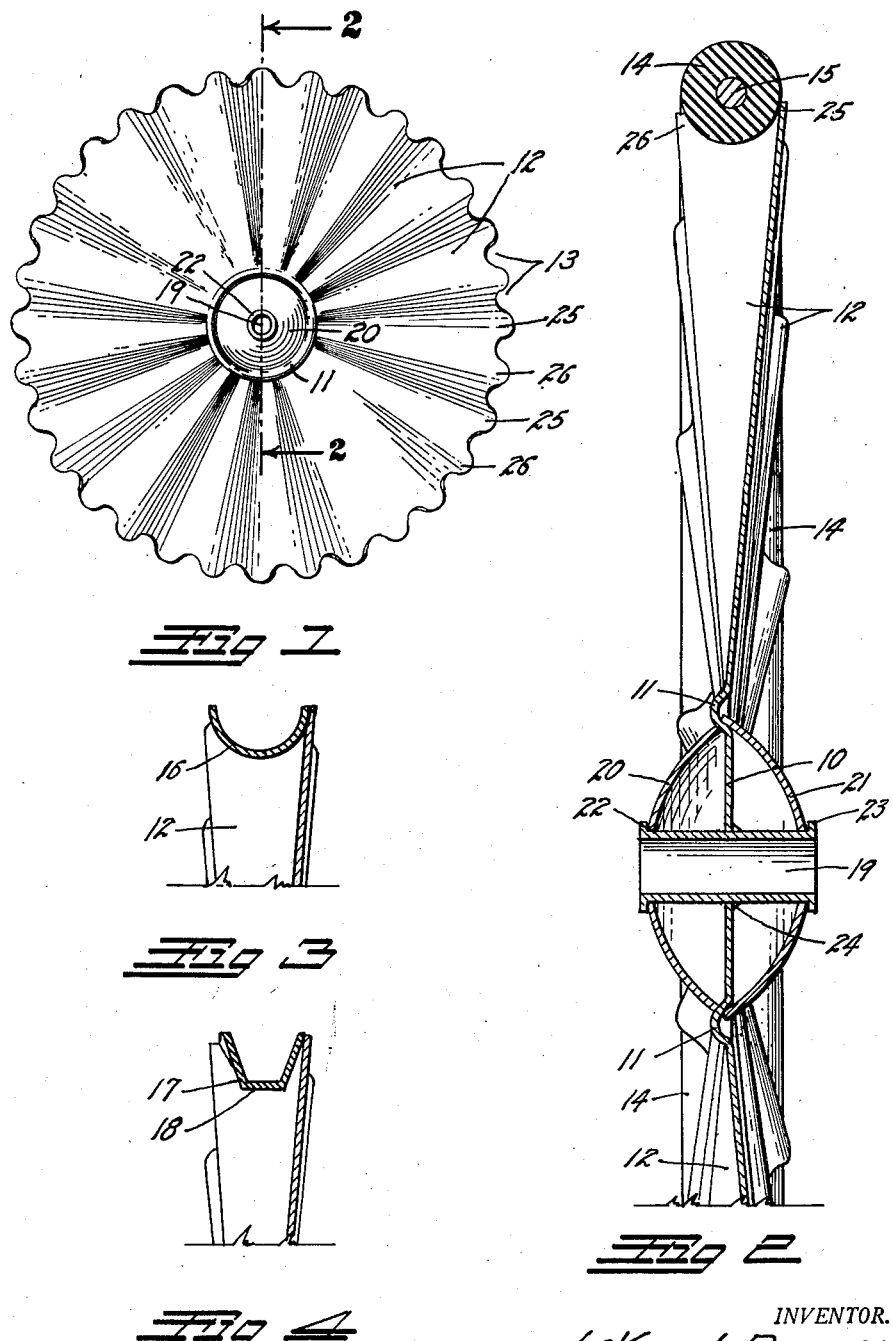

2,698,769
STAMPED METAL WHEEL CONSTRUCTION
La Von I. Powell, Denver, Colo.

Application March 31, 1951, Serial No. 218,634

1 Claim. (Cl. 301—63)

This invention relates to a disc wheel construction, and relates more particularly to the type of wheel used on toy wagons, "Kiddie" cars, and other relatively low-priced vehicles.

The principal object of the invention is to provide a wheel construction which can be economically stamped or pressed from sheet metal, and which will provide from a single metallic disc a rigidly braced wheel structure with a tire-receiving groove about its periphery which will eliminate the usual two or three piece welded or riveted structures.

Another object of the invention is to provide a wheel which may be economically stamped from a single disc of metal plate which can be used as a belt pulley or sheave for use with V-type or round belts.

Another object of the invention is to provide a hub structure for disc wheels which will efficiently brace the wheel from its supporting axle, and which can be very economically manufactured.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a face view of the improved disc wheel;

Fig. 2 is a magnified vertical section, taken on the line 2—2, Fig. 1;

Fig. 3 is a fragmentary cross-section through the rim portion of the improved wheel, illustrating a round, grooved rim applied thereto for receiving a round belt or tire; and Fig. 4 is a similar fragmentary section, illustrating a V-type rim applied to the wheel for use with the V-type belts.

Briefly, the improved wheel is formed from a disc of sheet metal having a notched periphery. The disc is corrugated to form tapering, radial corrugations with one of the peripheral notches at each side of each corrugation. The corrugations and the notches are so arranged that the notches will align with each other around the entire periphery of the wheel to provide a channel for receiving a tire, a belt or a rim, as desired.

As illustrated, a circular sheet metal disc is stamped to provide a plurality of uniformly spaced, peripheral notches 13 separated by rounded points. The edge of the disc is then corrugated to form a plurality of radial corrugations 12. The corrugations 12 extend from an annular, indented bead 11 which surrounds a flat, circular, middle area 10. The corrugations increase in width as the periphery of the wheel is approached. Each of the sides of each corrugation contains one of the notches 13, and the notches align with each other about the entire periphery of the wheel. This places the rounded points between the notches on alternate sides of the wheels, there being a series of points 25 at the rear face, and a series of alternate points 26 at the front face of the wheel.

The alternating, projecting points 25 and 26 form what might be termed an interrupted tire groove about the wheel for receiving a tire 14. The tire 14 may be provided, as is usual with solid rubber vehicle tires, with a wire core 15. Such tires are applied by cutting a length of tubular rubber tire slightly in excess of the circumference of the wheel, thence passing the wire core 15 through the tire. The extremities of the tire are then forced apart to allow the extremities of the wire core to be welded or wrapped together, after which, the tire is released so as to expand longitudinally so that the extremities thereof will be forced together to form a continuous, solid, annular rubber tire, as shown in Fig. 2.

The tire is held in place on the wheel by the points 25 and 26 and is self-supporting between the successive notches 13 about the entire periphery of the wheel. If a more rigidly circular wheel is desired, such as for use as a belt pulley or the like, an annular rim 16 having a semi-circular cross-section may be placed in the notches 13 and the extremities of the rim welded or otherwise secured together to form a complete circular member inset in the notches 13, as shown in Fig. 3, for receiving a round belt or tire. For use with V-belts, a similar rim having a V cross-section, as indicated at 17 in Fig. 4, is inset across the extremities of the corrugations 12 in suitably contoured notches 18.

The wheel may have any of the conventional hub structures. As illustrated, it is provided with a very economical and easily manufactured hub structure consisting of a flanged bearing tube 19 extending through and projecting oppositely outward from an axial opening in the flat portion 10 of the wheel. The bearing tube is maintained at right angles to the plane of the wheel by means of an outer disc 20 and an inner disc 21. The discs 20 and 21 are duplicates of each other and are formed with a semi-circular cross-section and provided with axial openings for the passage of the bearing tube 19.

The periphery of the disc 20 rests inside of and against the convex side of the bead 11. The periphery of the disc 21 extends into and against the concave side of the bead 11 so that both discs are rigidly held in place against lateral displacement.

The bearing tube 19 is provided with a first end flange 22, and after it is in place in the discs 20 and 21 and through the flat portion 10 of the wheel, its extremity is deformed to form a second retaining flange 23 which firmly clamps the two discs to the bearing tube 19 and to the wheel. If desired, the wheel may be additionally strengthened by welding the portion 10 of the wheel to the bearing tube, as indicated at 24.

The bearing tube may bear directly upon a supporting axle, or may receive suitable anti-friction bearings (not shown), depending upon the particular installation being made. The principal feature of the improved wheel resides in the flaring, radial corrugations, with the notches in the periphery extending across the corrugations to provide a tire or belt-receiving peripheral channel.

While a specific form of the improvement has been described and illustrated herein, it is to be understood that the same may be varied, within the scope of the appended claim, without departing from the spirit of the invention.

Having thus described the invention, what is claimed and desired secured by Letters Patent is:

A disc wheel comprising: a generally circular, sheet metal disc; radially extending, alternating, wave-like corrugations in said disc extending to the periphery thereof; notches formed in the circumferential extremities of said corrugations in circumferential alignment about the periphery of said disc; a circular, flat, central portion in said disc; an indented, circular bead formed in said disc about said flat central portion, said corrugations terminating at their axial extremities at said bead; a bearing tube extending concentrically through said flat central portion and projecting oppositely outward therefrom; end flanges formed on the extremities of said bearing tube; and a semi-spherical cup concentrically positioned about each extremity of said tube against the flange thereon, the peripheries of said cups resting against the circular bead about said flat central portion to maintain said disc at right angles to the axis of said tube.

References Cited in the file of this patent

UNITED STATES PATENTS

| | | |
|---|---|---|
| 413,933 | Howard | Oct. 29, 1889 |
| 716,342 | Livingstone | Dec. 16, 1902 |
| 1,049,378 | Livingston | Jan. 7, 1913 |
| 1,372,982 | Shoemaker | Mar. 29, 1921 |
| 1,372,983 | Shoemaker | Mar. 29, 1921 |
| 1,695,525 | Booth | Dec. 18, 1925 |
| 1,895,499 | Stough | Jan. 31, 1933 |
| 2,041,657 | Hight | May 19, 1936 |
| 2,551,783 | Ash | May 8, 1951 |